(12) United States Patent
Kligerman et al.

(10) Patent No.: US 8,777,191 B2
(45) Date of Patent: Jul. 15, 2014

(54) ENERGY ABSORPTION AND DISTRIBUTION MATERIAL

(75) Inventors: Randy Kligerman, Thornhill (CA);
Brian C. Jamieson, Toronto (CA);
Michael S. Du Maresq, Toronto (CA)

(73) Assignee: Spike Inc., Toronto (CA)

( * ) Notice: Subject to any disclaimer, the term of this patent is extended or adjusted under 35 U.S.C. 154(b) by 1182 days.

(21) Appl. No.: 12/470,379

(22) Filed: May 21, 2009

(65) Prior Publication Data

US 2010/0295221 A1    Nov. 25, 2010

(30) Foreign Application Priority Data

May 20, 2009    (CA) ..................................... 2666411

(51) Int. Cl.
*F16F 5/00* (2006.01)
*F16F 9/00* (2006.01)
*A47C 27/08* (2006.01)
*A47C 23/00* (2006.01)

(52) U.S. Cl.
USPC ...... 267/140.11; 267/117; 267/119; 267/152; 267/142; 267/145; 36/28; 36/29; 188/371

(58) Field of Classification Search
USPC ............ 267/140.11, 117, 119, 152, 142, 145; 188/371; 33/28, 29
See application file for complete search history.

(56) References Cited

U.S. PATENT DOCUMENTS

| | | | |
|---|---|---|---|
| 2,434,641 A * | 1/1948 | Burns | .......................... 267/117 |
| 3,251,076 A | 5/1966 | Burke | |
| 3,280,410 A * | 10/1966 | Propst et al. | ................... 267/119 |
| 3,633,228 A | 1/1972 | Zysman | |
| 4,348,442 A | 9/1982 | Figge | |
| 4,495,237 A | 1/1985 | Patterson | |
| 4,604,319 A | 8/1986 | Evans et al. | |
| 4,985,931 A | 1/1991 | Wingo, Jr. | |
| 5,607,749 A * | 3/1997 | Strumor | ........................ 428/156 |
| D378,968 S | 4/1997 | Martin et al. | |
| 5,806,889 A | 9/1998 | Suzuki et al. | |
| 5,853,844 A | 12/1998 | Wen | |
| 5,927,696 A | 7/1999 | Hagemeister | |

(Continued)

FOREIGN PATENT DOCUMENTS

| | | |
|---|---|---|
| CA | 1205997 | 6/1986 |
| EP | 0863056 A1 | 9/1998 |

(Continued)

OTHER PUBLICATIONS

Foreign communication from a related application—International Search Report and Written Opinion, PCT/CA2009/001275, Feb. 3, 2010, 10 pages.

*Primary Examiner* — Syed A Islam
(74) *Attorney, Agent, or Firm* — Conley Rose, P.C.; Rodney B. Carroll

(57) ABSTRACT

An energy absorbing and transmitting material comprising a framework of interconnected units comprising at least one unit having a base and a protrusion or cone extending from the base along an axis, and at least one connecting member or rod that connects the unit to at least one adjacent unit, the connecting members extending substantially perpendicular to the axis of the unit from the base, where the framework is comprised of a single elastic material throughout, or configured so that when the framework is perturbed by tilting the unit towards the adjacent unit, the adjacent unit is tilted towards the unit.

27 Claims, 9 Drawing Sheets

(56) References Cited

U.S. PATENT DOCUMENTS

| | | |
|---|---|---|
| 6,093,468 A | 7/2000 | Toms et al. |
| 6,415,467 B1 * | 7/2002 | Bretvin .............................. 5/710 |
| 6,681,907 B2 | 1/2004 | Le |
| 6,777,062 B2 | 8/2004 | Skaja |
| 6,878,431 B2 | 4/2005 | Sameshima et al. |
| 6,969,548 B1 | 11/2005 | Goldfine |
| 7,052,077 B1 | 5/2006 | Kalageros et al. |
| 7,089,690 B2 | 8/2006 | Krstic |
| 7,254,852 B2 * | 8/2007 | Martin .............................. 5/636 |
| 7,493,708 B2 * | 2/2009 | Crowley, Jr. ...................... 36/28 |
| 7,748,141 B2 * | 7/2010 | Smith et al. ....................... 36/28 |
| 7,930,839 B2 * | 4/2011 | Litchfield et al. ................ 36/29 |
| 2004/0128860 A1 * | 7/2004 | Smaldone et al. ................ 36/28 |
| 2005/0133324 A1 | 6/2005 | Soto Bailon et al. |

FOREIGN PATENT DOCUMENTS

| | | |
|---|---|---|
| GB | 2401416 A | 11/2004 |
| JP | 56131849 A | 10/1981 |
| JP | 9150692 A | 6/1997 |
| WO | 9014942 A1 | 12/1990 |
| WO | 0241734 A2 | 5/2002 |
| WO | 2005050053 A1 | 6/2005 |
| WO | 2007035800 A2 | 3/2007 |

* cited by examiner

ENERGY ABSORPTION AND DISTRIBUTION MATERIAL

CROSS-REFERENCE TO RELATED APPLICATIONS

This application claims priority to Canadian Patent Application No. 2,666,411 filed May 20, 2009, entitled "Energy Absorption and Distribution Material," which application is incorporated by reference herein in its entirety.

FIELD OF THE INVENTION

The present invention relates to a material for absorbing and distributing kinetic energy for use in bearing loads or absorbing impacts or vibrations.

BACKGROUND OF THE INVENTION

Various materials may be used to absorb or dissipate energy from an impact, vibration or load which would otherwise be transmitted to an underlying structure or body. Such materials are used in a wide variety of applications where such absorption or dissipation is desirable, for example, in sporting equipment for contact sports, building materials, sound proofing materials, seating cushions or automobiles.

A common impact absorption apparatus is a sheet of material having a uniform thickness made of an elastic foam or rubber. A sheet of plastic foam may act as a cushion, absorbing some energy from a load or impact by the compression of the material, so less energy is transmitted through the material to the underlying structure.

There are a number of drawbacks for these impact-absorbing devices. Specifically, these devices typically rely on compression as the most important mechanism for reducing the transmission of force from an impact or load to any underlying structure. Consequently, their effectiveness in absorbing energy from impacts or loads is largely dictated by the thickness of the impact-absorbing material and its elasticity and density.

The required thickness of the impact-absorbing material in a molded piece device gives rise to a number of undesirable properties. When wearing such a device, the wearer's range of motion may be restricted because the thickness of the material required for effective impact-absorption reduces the flexibility of the device. The materials typically used are also typically limited in elasticity, further reducing flexibility. In addition, the thickness and coverage of the molded piece device limits the airflow between molded piece device and the body, causing body heat to be undesirably retained. The ability to make such a device lightweight is also limited by the dependence on the thickness of the material.

Such devices are typically only suitable for a relatively small range of impact forces, as the material will not provide the appropriate resistance outside of that range. Thin low density material does not generally provide sufficient energy absorption in an application where high-energy impacts are expected.

On the other hand, dense materials must be used with caution because of the possibility of injury or damage to the underlying material if they are too dense or rigid. Thus, in many applications, these devices tend to be less flexible or heavier than desirable because of the thickness required for a low enough density material to provide sufficient resistance in the case of an impact.

There are devices that include structural features and the use of composites to absorb energy. For example, there are materials which comprise two impact absorbing materials of different densities that are layered and held together by physical means, adhesives or welds. A softer, lower density material layer may present a more forgiving surface for body contact, while a denser, harder material layer provides more resistance at a reduced thickness. There are also materials that comprise a composite structure having a plurality of cones affixed onto a semi-rigid or rigid substrate of a different material.

While these devices provide some advantages over sheets of plastic foam, these devices rely on compression as the most important mechanism for reducing the force from impacts. Consequently, the effectiveness of these devices is dictated primarily by the thickness of the materials. Since the effectiveness of the devices generally depends on the amount and density of material present in the device, the ability to achieve a lightweight and flexible device is limited.

There is a need for an impact-absorbing structure that is flexible, lightweight and not bulky, and that responds differently depending on the level of force applied.

SUMMARY OF THE INVENTION

The present invention relates to an energy absorbing and transmitting material comprising a framework of interconnected units comprising:

at least one unit having a base and a protrusion extending from the base along an axis, and at least one connecting member that connects the at least one unit to at least one adjacent unit, which extends substantially perpendicular to the axis from the at least one unit proximate to the base, wherein the framework is comprised of a single elastic material throughout.

The present invention also relates to an energy absorbing and transmitting material comprising a framework of interconnected units comprising:

at least one unit having a base and a protrusion extending from the base along an axis, at least one adjacent unit adjacent to the at least one unit having a second base and a second protrusion extending from the second base along a second axis, the second axis substantially parallel to the axis when the framework is at rest, at least one connecting member that connects the at least one unit proximate to the base to the adjacent unit proximate to the second base, which extends substantially perpendicular to both the axis and the second axis between the units when the framework is at rest, wherein the at least one connecting member is elastic, and when the framework is perturbed such that the at least one unit is tilted towards the adjacent unit by a force applied to the protrusion offset from the axis at an angle greater than 0 degrees and less than 90 degrees, the adjacent unit is tilted towards the unit.

The invention may further relate to the material described above, wherein the protrusions each have a tip extending from the protrusions along the axis, the tips being the same or differently sized or shaped.

The invention may further relate to the material described above, wherein the at least one unit further comprises at least one base projection extending from the base, or two or more base projections extending from the base and spaced apart and arranged on the base.

The invention may further relate to the material described above, wherein the at least one unit and the at least one adjacent unit have differing densities, different shapes, or sizes, or further comprises at least one additional unit proximate to the unit and the adjacent unit in the framework having a different density, size or shape than the unit and the adjacent unit.

BRIEF DESCRIPTION OF THE DRAWINGS

Embodiments of the invention will be described by way of example and with reference to the drawings in which:

FIG. 6b is a top view of a framework of units of FIG. 6a.

FIG. 8b is a perspective view of a framework of units of FIG. 8a.

DETAILED DESCRIPTION

Figure 1:
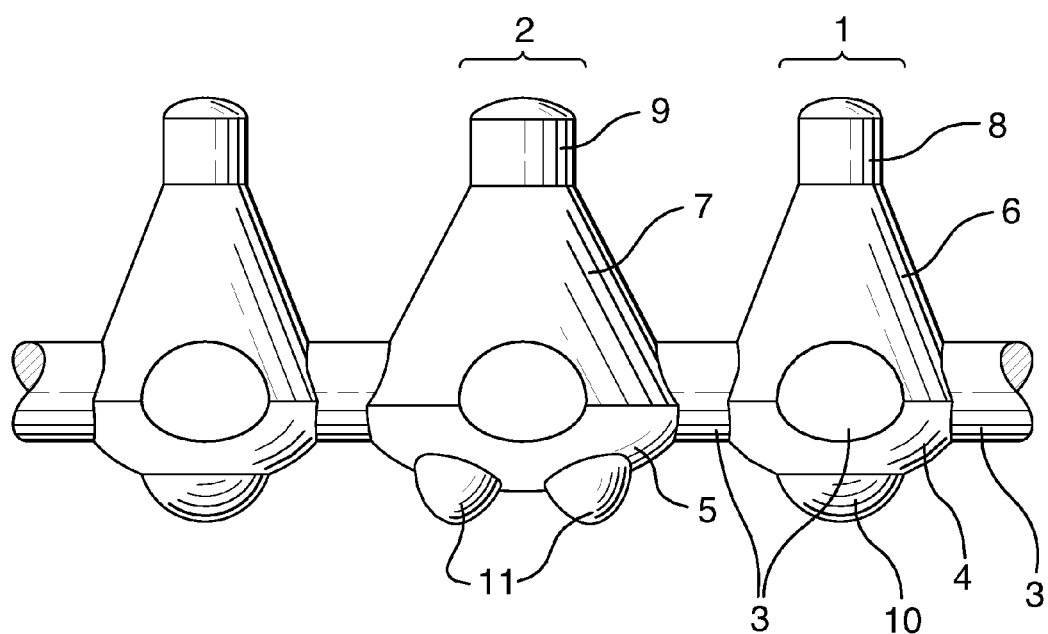
FIG. 1 is a cross sectional view of units in one embodiment of the current invention.

FIG. 1 shows a section of one embodiment of the present invention. A unit (1 or 2) comprises a base (4 or 5) and a protrusion (6 or 7) extending upwardly from the base (4 or 5). Adjacent units 1, 2 are joined together by at least one connecting member 3 at or near the base 4, 5 of each unit 1, 2 to form a framework.

In this preferred embodiment, each unit 1, 2 comprises a tip 8, 9 positioned at the uppermost portion of the protrusion, and at least one base projection 10, 11 extending downwardly from each base 4, 5. In other embodiments, the tips, the base projections, or both may be omitted.

Protrusion 6, 7 extends upwardly from the base 4, 5 along a vertical axis. The protrusion 6, 7 may compress under a load, and may also tend to deflect away from a vertical orientation when under load. In the preferred embodiment shown, the protrusions 6, 7 are conical.

In this preferred embodiment, bases 4, 5 are rounded in a hemispherical shape. At least one base projection 10, 11 may extend downwardly from each base 4, 5 to reduce contact between the units and any underlying surface. The shape of the base 4, 5 and the positioning and shape of the base projections may also be selected to increase the tendency of certain units to tilt relative to adjacent units.

In an impact, the units 1, 2 may both compress and deflect, thereby dissipating the energy along connecting members 3. Under load, some of the units will tend deflect or tilt relative to other adjacent units.

The deflection of any particular unit 1, 2 will cause energy to be transferred to other units in the framework by bending and pulling motions through connecting members 3 and other units not immediately adjacent to the units 1, 2. Connecting members 3 are preferably joined to the units 1, 2 to allow the deflection of the units to occur in an impact. Preferably, connecting members 3 will be joined to the units 1, 2 at or near the base 4, 5, and may be located where the base 4, 5, and the protrusion 6, 7 meet, thereby causing units and adjacent units to tilt towards each other when one is deflected or tilted.

Each unit 1, 2 may also comprise a tip 8, 9 positioned at the uppermost portion of the protrusion 6, 7. By frictional contact with a surface, the tip 8, 9 will tend to deflect when presented with an impact to effectively absorb vibrations and concussive forces of lower energy. The tip 8, 9 may also aid in the deflection of protrusion 6, 7 at higher impact forces. Although the heights of protrusions 6, 7 do not have to be identical, it is preferable that all of the tips grouped at the area of impact will experience deflection at the impact.

The tips 8, 9 may be shaped differently or have a different density than the underlying protrusions 6, 7 such that the tips 8, 9 are relatively more likely to deform under load than the underlying protrusions 6, 7. For example, as shown in the figures, the tips 8, 9 may be cylindrical, placed upon conical protrusions 6, 7. The tips 8, 9 are more likely to deform than the conical protrusions 6, 7 if they experience any loads that are not straight downwards onto the tips 8, 9, and will typically bend under such loads.

Figure 2:
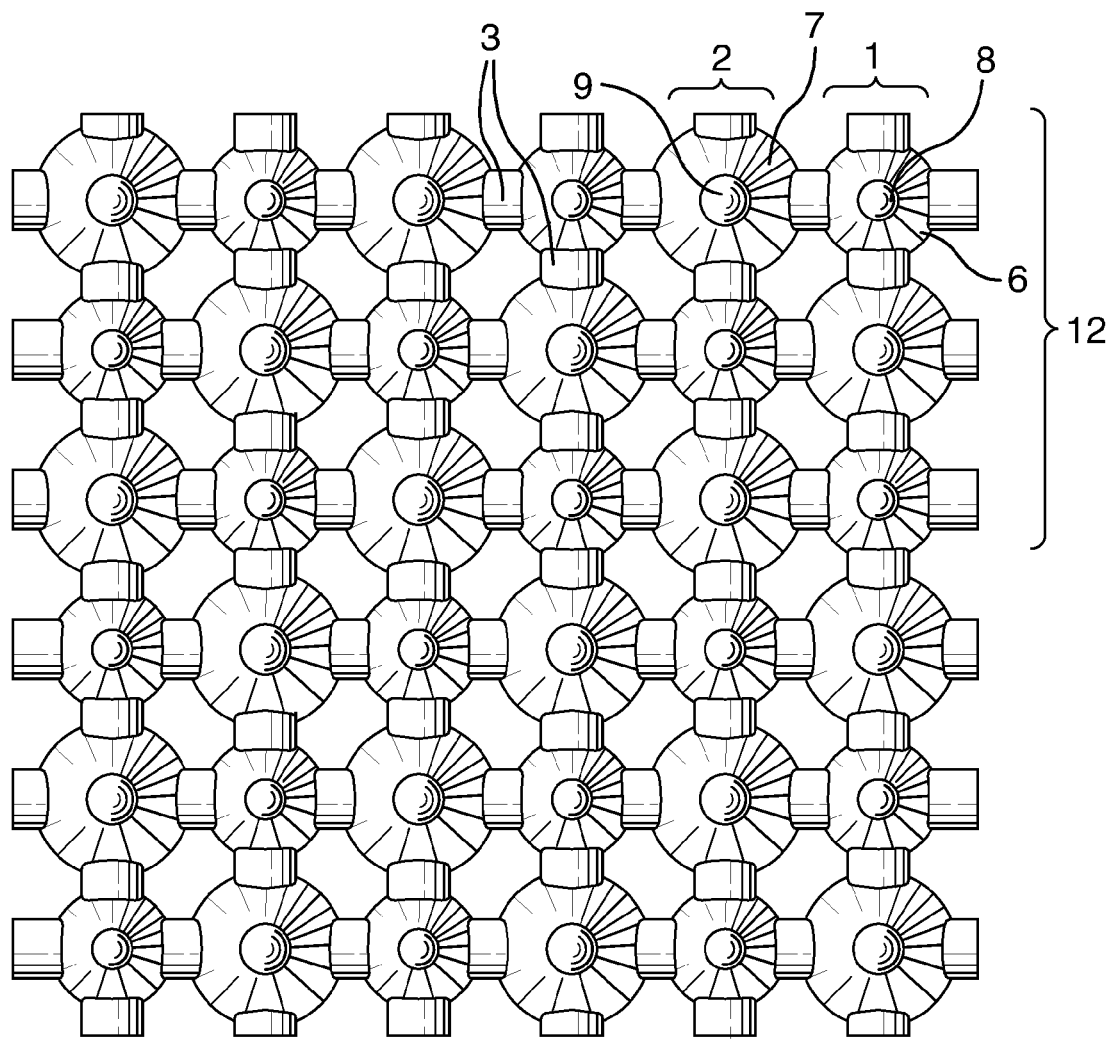
FIG. 2 is a top view of a framework of units of FIG. 1.

In FIG. 2, units 1, 2 are joined to each other and to other units by at least one connecting member 3 to make a framework or web of connected units 12. The base of protrusion 6, 7 may be circular, and the base of protrusion 7 may be of a larger diameter than base of protrusion 6.

In a preferred embodiment, the narrower unit 1 and the wider adjacent unit 2 are arranged to alternate from each other in framework 12. The unit and the adjacent unit may be identical in size, shape and density, or may differ in any one or all of those properties.

In an alternative embodiment, there are three or more units of differing sizes, shapes or densities in the framework. In this alternative embodiment, the sizes, shapes and densities of the units could be varied across a framework to accommodate differences in the loads anticipated in various areas of the framework. For example, in an application where an underlying structure has a delicate or sensitive area, and has one or more points surrounding the delicate area that are more robust, a framework could be adapted with smaller or less dense units over the sensitive area, and larger or more dense units over the robust areas. This may serve to focus loads applied to the entire framework on the more robust points, and comparatively less on the delicate portions.

Another example would be to use differently sized or shaped units to better deflect impacts that are more focused, in that they apply force to the framework over a smaller portion of the framework. Smaller units could be employed in those regions where more focused impacts or loads are expected.

The difference in compression and deflection properties between the unit and the adjacent unit may result in a framework that resists more responsively to varying levels of force. The narrower unit 1 may tip or tilt more readily than the wider adjacent unit 2. The addition of the tips 8, 9 may add additional capability of the framework 12 to dissipate energy, as the deformation of the tips 8, 9 absorbs some energy, and increases the tilting of the units 1, 2 throughout the framework 12, thereby dissipating additional energy.

When the unit 1 and the adjacent unit 2 are tilted towards each other under a load, when the amount of the load increases, the units will deflect further to a certain degree, but will also increasingly compress. Under larger sustained loads, the units will have completely deflected, resting on each other, on connecting members, or on the underlying structure. Under these circumstances, the material will behave like a uniform sheet of foam, continuing to compress under the sustained load. Preferably, the material is elastic, so that when the load is removed, the units resume their original positions relative to the framework.

In other embodiments according the present invention, the different sizes of units may be in other regular arrangements within the framework. For example, one large or wide unit may be placed as every third, fourth, fifth, etc. unit with all other units being smaller or narrower units in each row. In other embodiments, the different sizes of units may be arranged irregularly to accommodate expected loads appearing in particular locations of the framework, or entirely randomly through the framework. In alternative embodiments, any one or all of the protrusions 6, 7, the bases 4, 5, the connecting member 3, the tips 8, 9 if present, and the base projections 10, 11 if present, may be of the same or different sizes, shapes, densities or materials.

It is preferable that the same material is preferably used throughout the framework. Using the same material throughout may be desirable because the material can be easily molded or shaped as a single continuous sheet, thereby making it easier to manufacture. In one embodiment, the material is molded in an injection or compression mold.

Also, while the same material is preferably used throughout the framework 12, the density of the materials in each of the various units may be controllably varied from each other in order to vary the impact-resistance profile. As with size, alternating the density in the framework 12 may result in a wider range of responsiveness to applied forces because of the difference between the compression and deflection properties. In other embodiments, protrusion 6 may be of a higher or lower density than protrusion 7, tip 8 may be of a higher density or lower than protrusion 6, and/or tip 8 may be of a higher or lower density than tip 9. In this embodiment, it is possible to vary the density of certain elements of the framework by injecting relatively more material into the mold in those points where a higher density is desired.

For example, in an embodiment having a unit and corresponding tip having a higher density than an adjacent unit, the higher density unit is comparatively more rigid, and may be more likely to tilt under an initial load. As the load increases, the softer units will bear the load in compression as the comparatively denser units tip over until they are fully deflected. Once fully deflected, the comparatively dense units will also bear the load in compression, thereby providing additional resistance to the increased load. In this example, the material is capable of responding non-lineally to a range of loads, or a changing load, as a function of the differing densities and the particular structure of the framework of units. The size, shape and density of the units could be tailored to fit a variety of different potential load curves.

Figure 3:
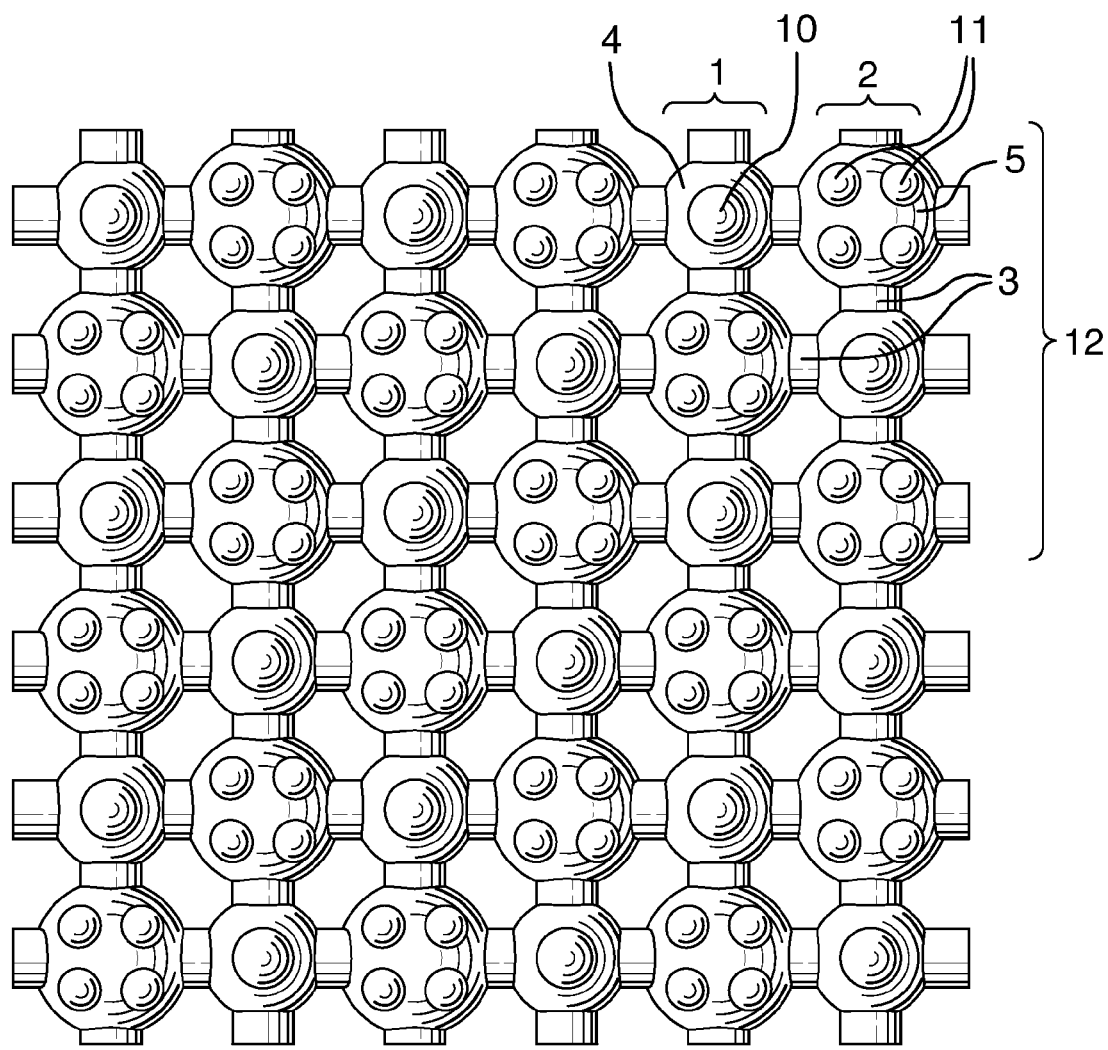
FIG. 3 is a bottom view of the framework shown in FIG. 2.

FIG. 3 shows the arrangement of units in framework 12 as viewed from the bottom. Each unit may independently have one or multiple base projections 10, 11. Further, the base projections 10, 11 can vary in size. The base projections 10, 11 may be arranged so that a unit is comparatively more likely to deflect or tilt relative to an adjacent unit. This may be achieved by arranging a number of base projections around the base in a square, triangle or other regular polygonal arrangement to provide a relatively stable platform on the unit, and a single or an irregular arrangement of base projections on the adjacent unit to provide an unstable platform.

FIGS. 2 and 3 also depict four connecting members 3 arranged at 90 degrees around each unit f, 2 resulting in a framework that is organized in a square grid. In other embodiments of the invention, units may be joined together with varying numbers of connecting members, and the connecting members connected to a particular unit may be offset from each other at different angles. The frameworks in such embodiments would be different geometric arrangements, for example, as triangular or hexagonal grids.

Figure 4:
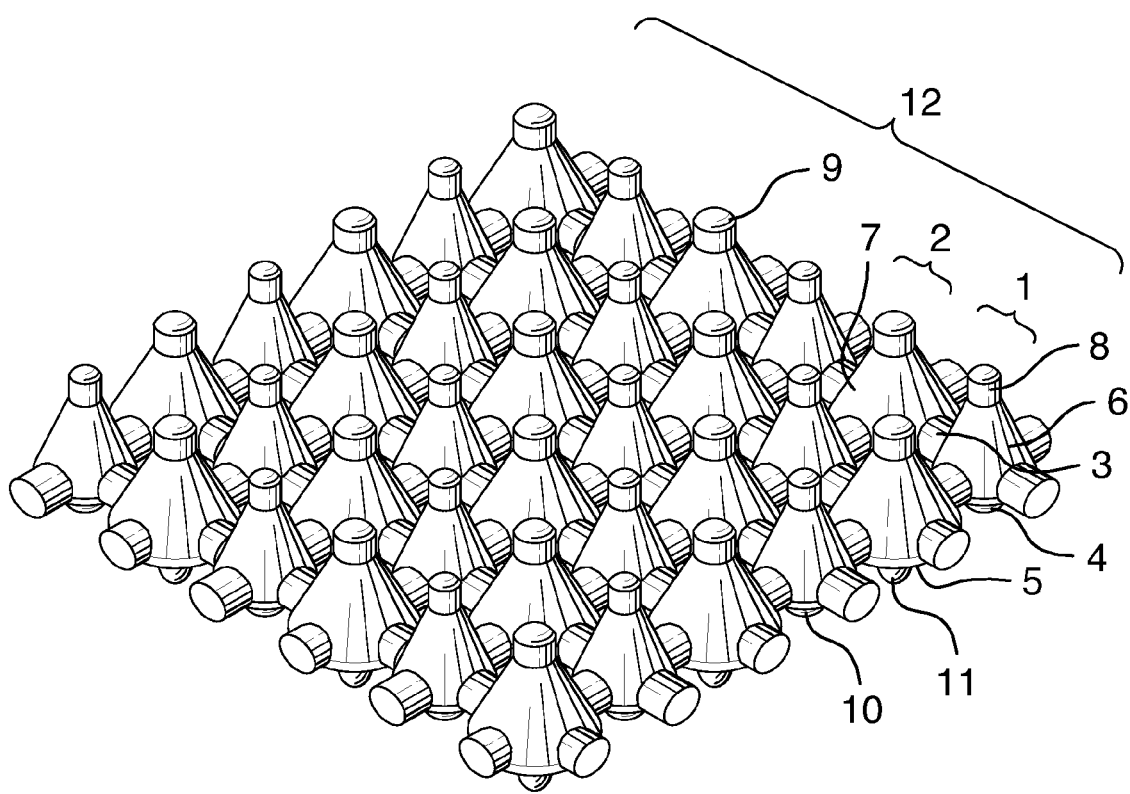
FIG. 4 is a top perspective view of the framework of FIG. 2.

The top structure of the framework of the same embodiment is shown in FIG. 4. In an impact, tips 8, 9 may dampen vibrations and cause the framework to move congruously with the forces of impact. At greater forces, one or a group of units 1, 2 will bend against the connecting members 3, which causes energy to be diffracted and dissipated along these connecting members.

Figure 5:
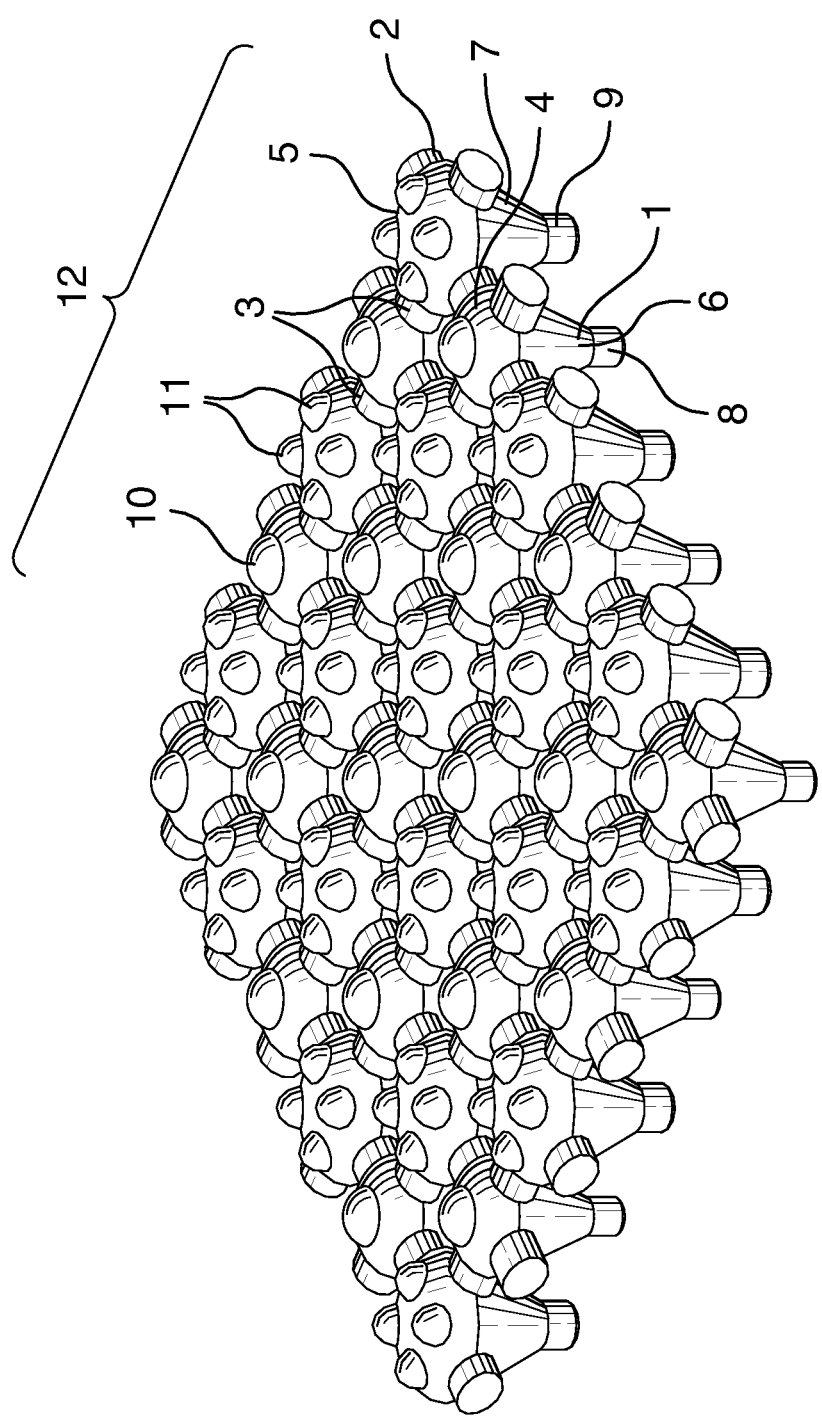
FIG. 5 is a bottom perspective view of the framework of FIG. 2.

As depicted in FIG. 5, bases 4, 5 are preferably rounded to form a hemispherical structure to minimize contact with the underlying contact surface (not shown) below the framework. The hemispherical shape of bases 4, 5 may allow air flow through the framework to be maximized and enhance the ability of the units 1, 2 to tip and roll relative to each other.

Base projections 10, 11 may further minimize contact between the framework 12 and the contact surface. When structured in this manner, the bases 4, 5 may also aid in absorbing impact by compressing to allow more bending of connecting members from perpendicular downward forces. This bending both absorbs and spreads the energy through the framework.

The protrusions may be any shape capable of bearing a load. In other embodiments, the protrusion may be formed in any suitable shape or shapes for bearing load in compression, such as frustocones, hemispheres, ovoids, cylinders, any polyhedron, or any shape that tapers towards the top.

Figure 6A:
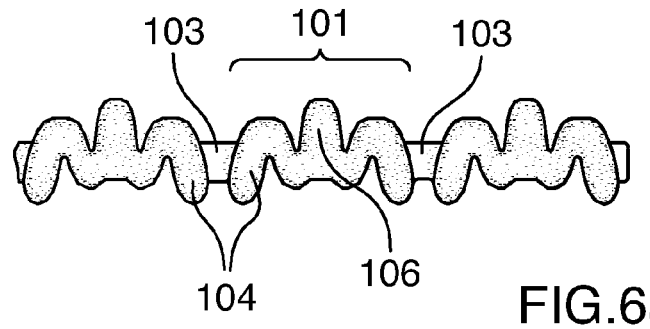
FIG. 6a is a cross sectional view of connected units in another embodiment of the invention.

For example, FIG. 6a shows another embodiment of the invention in which the protrusions are differently shaped. The unit 101 comprises of an inverted annular trough shaped base 104 which connects to a conical protrusion that is open from the bottom 106. As force is applied to the protrusion 106, the unit 101 may compress asymmetrically. Bending and pulling motions of the unit 101 through the base 104 transfers the energy from an impact through connecting members 103 to the other units.

Figure 6B:
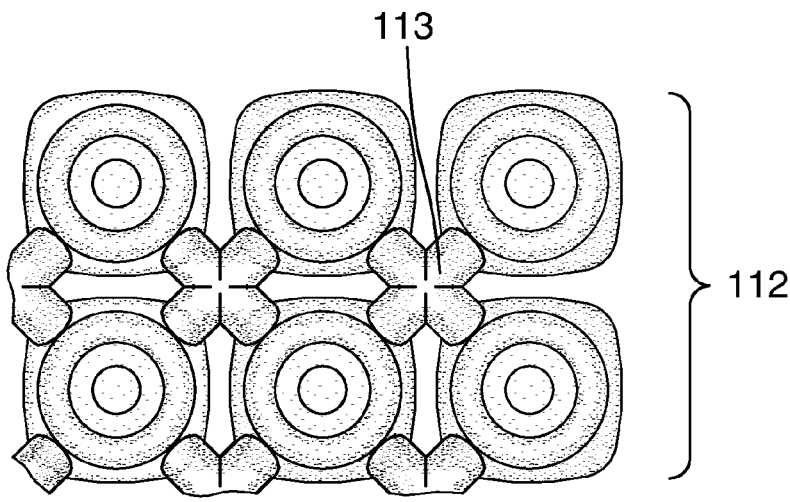

FIG. 6b depicts an example of how the units in FIG. 6a may be joined in a framework 112. It should be noted that there are many configurations for connecting members to be connected to units. In FIG. 6b, each connecting member 113 is connected to four units separated by 90 degrees, giving the appearance that one connecting member "intersects" with another.

Figure 7:
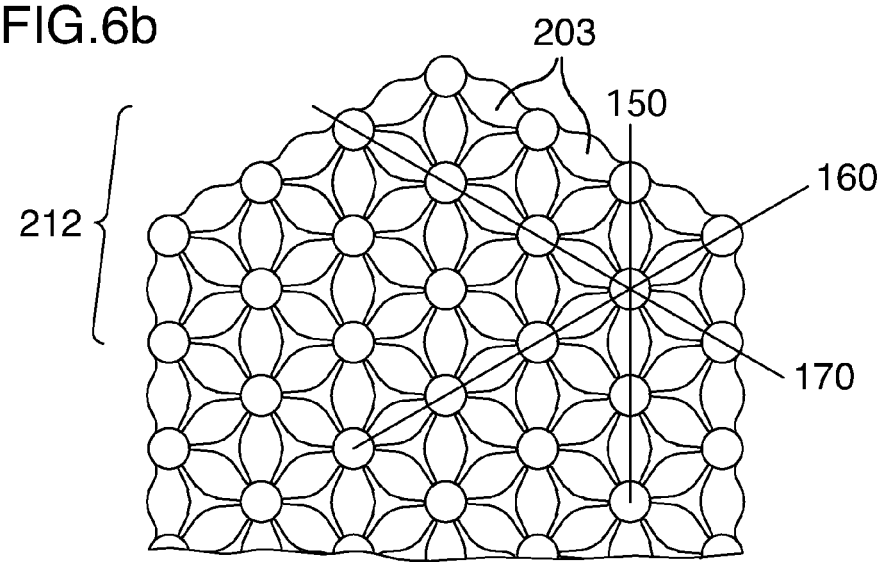
FIG. 7 is a top view of a framework in another embodiment of the invention.

FIG. 7 shows that units may be joined together in framework 212 where the connecting members 203 separated at 60 degrees on each unit. As a result, the connecting members 203 are aligned on three axes 150, 160, 170. In other embodiments, there may be different numbers of connecting members connected to each unit, and the connecting members connected to a particular structural unit may be offset from each other at different angles.

Returning to FIG. 7, connecting member 203 may be tapered at the connections with the units. In other embodiments, the dimensions of a connecting member may be varied in other ways according to the application and the properties desired. For example, the length and/or thickness or diameter of connecting member may be varied according to the properties desired. While thicker, shorter connecting members may be used to transfer energy more effectively and resist higher impacts, narrower connecting members can provide greater elongation and flexibility, and the resulting framework would also be lighter and allow more air flow. Connecting members may also be curved, or tapered at one or both ends. Different densities are also possible. Further, a mix of different connecting members may be used in a particular framework to direct forces to a particular area of the framework.

Figure 8A:
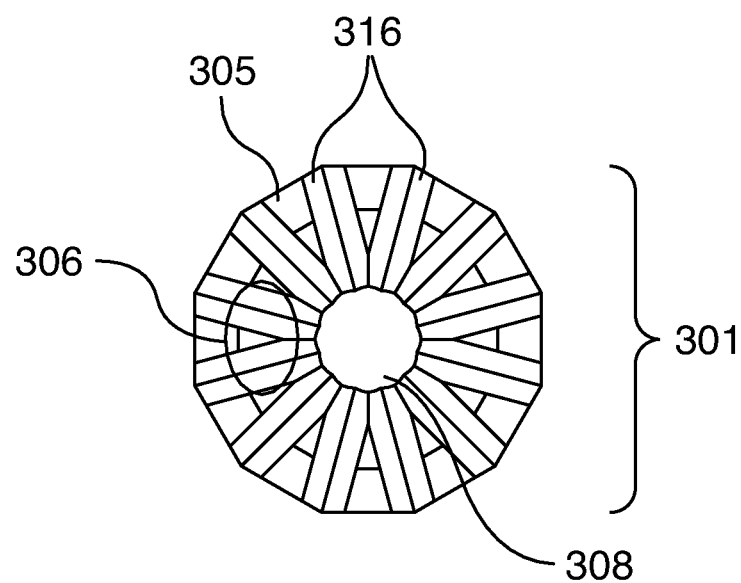
FIG. 8a is a cross sectional view of a unit according to the invention.

FIG. 8a depicts another embodiment of a unit according to the invention. The unit 301 comprises an annular base 305 from which the protrusion 306 comprises multiple supports 316 projecting from the base 305. Tip 308 is at the intersection where the multiple supports 316 intersect within the ring drawn by the base 305.

Figure 8B:
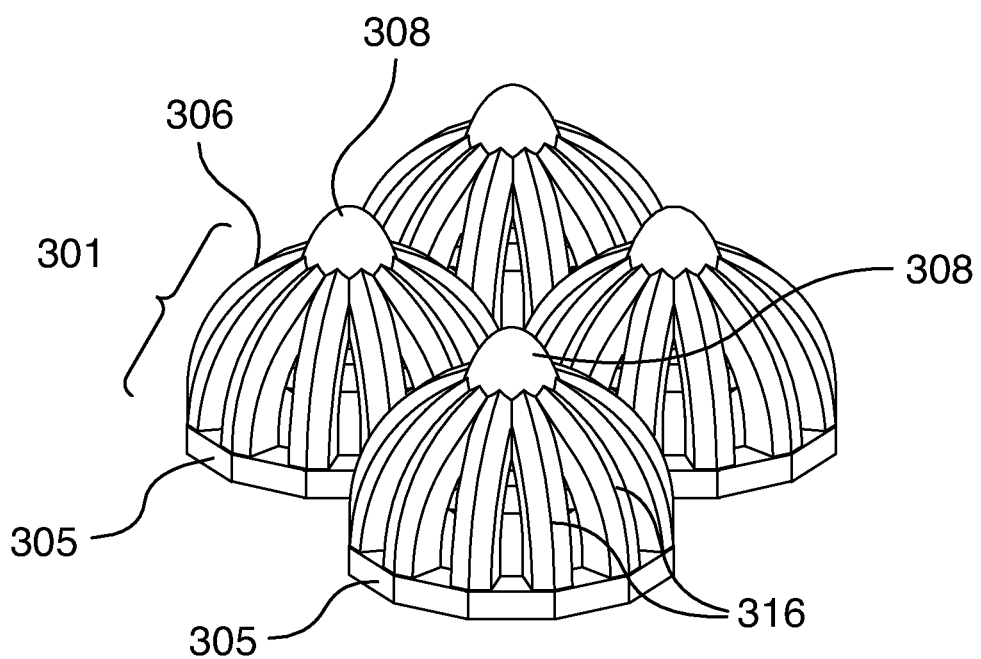

In FIG. 8b, the multiple supports 316 of a unit 301 form a hemispherical protrusion 306 above the base 305. Tip 308 is suspended at the top of the protrusion 306, where the multiple supports 316 intersect.

Figure 8C:
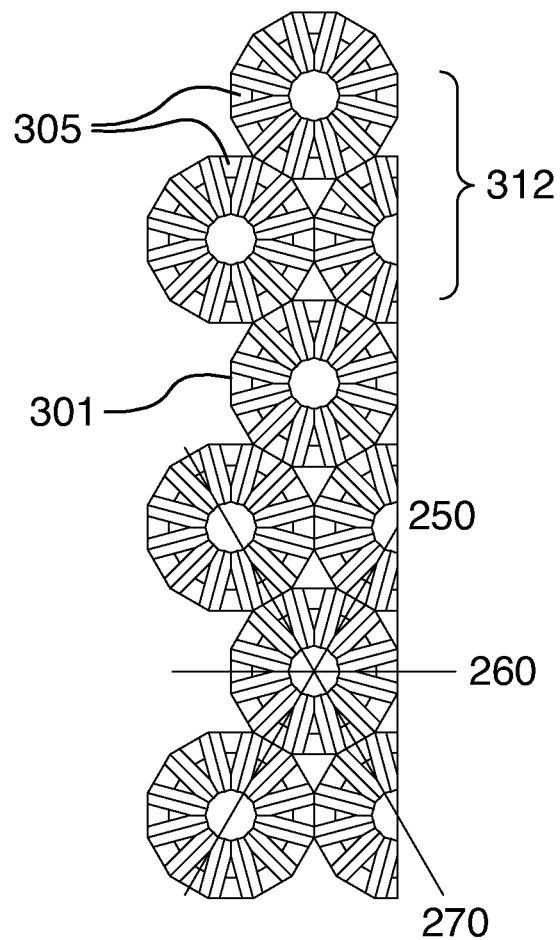
FIG. 8c is a top view of a framework of units of FIG. 8a in another embodiment of the invention.
Figure 8D:
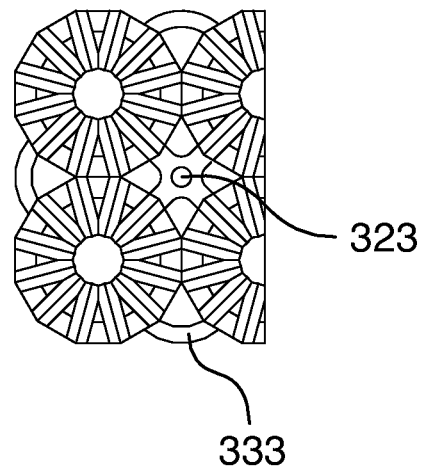
FIG. 8d is a top view of a framework of units of FIG. 8a in another embodiment of the invention.

FIG. 8c shows how the units of 8a may be joined to form a framework 312. Rather than being joined by connecting members, units 301 are joined by direct contact between the bases 305. In this embodiment, the units 301 may be arranged along three axes at 60 degrees from each other 250, 260, 270 in the framework 312.

The units may also be connected by both direct contact and connecting members 323, 333. There may be primary connecting members 323 that may each connect to multiple units, and there may also be secondary connecting members 333 that curve.

Figure 9:
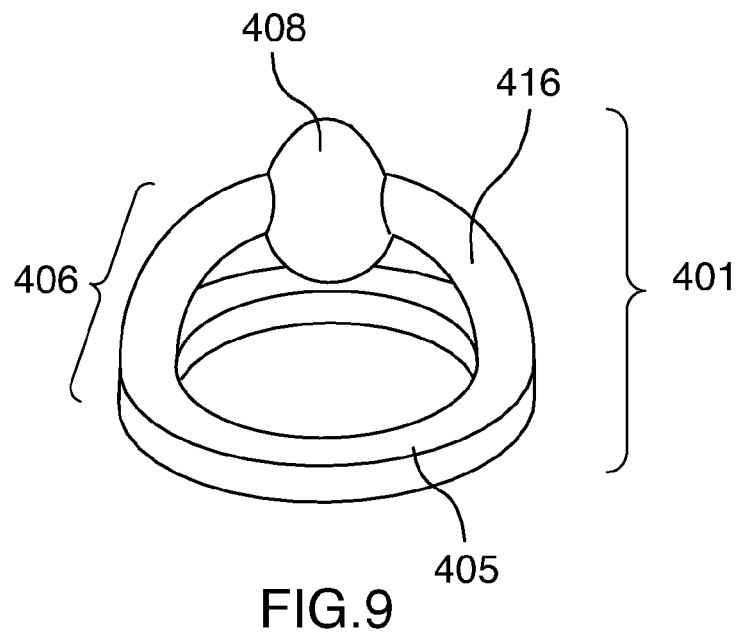
FIG. 9 is a side view of a unit according to another embodiment of the invention.

FIG. 9 depicts another possible unit shape. The protrusion 406 in this unit 401 comprises two supports 416 projecting from the annulus base 405. A tip 408 sits at the apex of protrusion 406 where the two supports 416 meet.

The present invention is particularly suited to uses in sports equipment such as helmets, chest protectors, shin guards and pads because it is flexible, light-weighted, hygienic, customisable and possesses a continuous impact-resistance profile and maximizes air flow. For these applications, the framework of structural units may be made to conform to a particular three-dimensional shape, and/or covered on one or both sides with over layer shells to guard against piercing forces.

Figure 10:
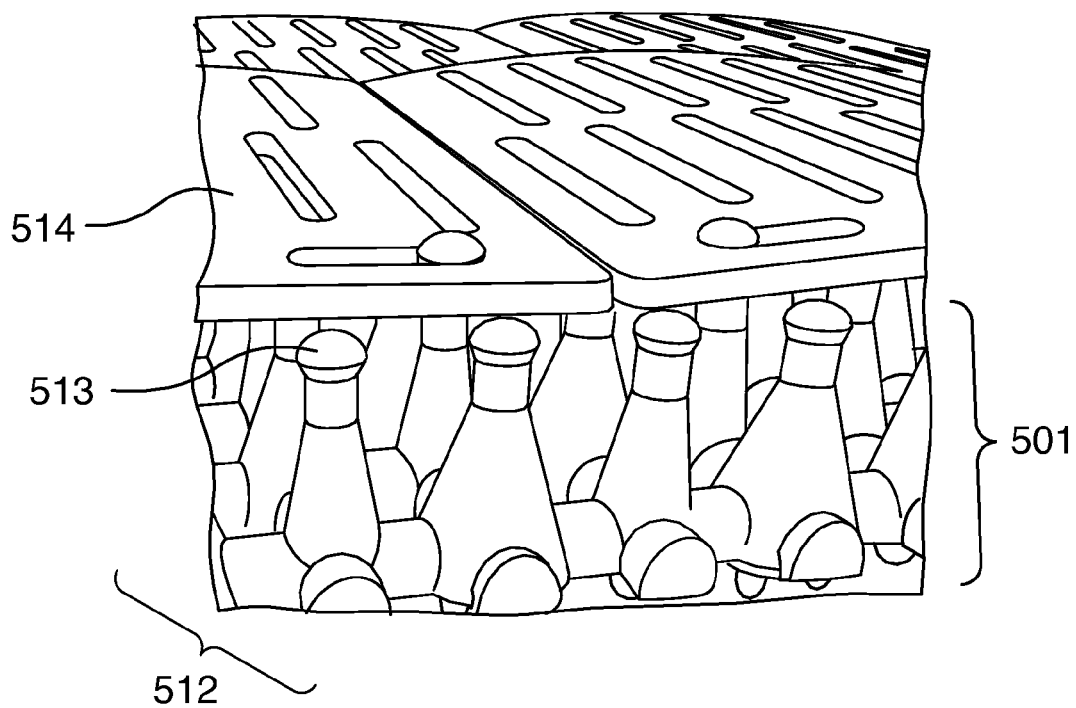
FIG. 10 is a perspective view according to another embodiment of the invention.

As shown in FIG. 10, one or more units 501 in a framework 512 may have an additional projection 513 which may be engaged or affixed to a layer of another material, depending on the application. In one application, rigid or semi-rigid plates 514 may be attached to these additional projections 513. In the embodiment shown, some but not all of the units 501 are attached in this manner, permitting some of the units in the framework, 512 to tilt and deflect as described above when the plate 514 is loaded against the framework 512. Such additional projections 513 may allow the plates to slide relative to the framework. The plates may be removable or permanently affixed.

In another embodiment, which is not shown, the tips or additional projections of some units of a framework are affixed to a flexible material, such as fabric. Under load, the fabric pulls the units affixed to it, tilting and deflecting those units and other adjacent units, even when the units are relatively far from the point where the load is being applied.

In another embodiment, the framework may be affixed or attached to the underlying surface in portions, thereby permitting at least some of the units to tilt and deflect under load.

It is preferable that the entire framework is made of a single material. The suitable material would be compressible, and preferably elastic. It is also preferable to use a material which density or compressive properties could be varied without significantly losing its elastic properties. Examples of suitable materials include elastomers, plastics generally, organic and synthetic rubbers, and foams. A preferred material for this invention is an elastic closed cell EVA (ethylene vinyl acetate) foam. However, the framework would also work if two or more materials are combined, such as a first material for the connecting members, and a different material for the units, which nevertheless permitted adjacent units to tilt and deflect under load.

The invention is preferably made in a mold, although it could be made by machining, milling or any other suitable process. It is also preferable that a framework according to the present invention be entirely made in one process. However, it is possible that it be made using multiple stages. For example, the connecting members and protrusions could be molded separately from each other, or the top and bottom halves of the framework could be pre-molded, and then affixed or molded together.

As discussed above, frameworks made according to the present invention may be varied in many ways, including by shape, size, density, material and configuration of the units, dimensions of the connecting members and also configuration and arrangement of the units within the framework. Then, by choosing among these variables, the framework according to the present invention may be used not only as a general means to absorb energy from impacts and vibrations, but may also be easily customised to particular applications. For example, the framework may be designed to absorb more energy in one particular area, and/or deflect more energy or force to a particular area or along a particular axis.

The framework may also be configured such that all of the units are intersecting by a plane which is flat, or which is curved to fit around or against a three dimensional object. Portions of framework may be adhered or coupled together to accommodate three dimensional shapes, or to provide additional dampening power when layered.

Due to its characteristics, the present invention is suitable for many applications, including any applications requiring load bearing, vibration dampening or mitigating of forces of impact.

It will be appreciated that the above description relates to the preferred embodiments by way of example only. Many variations on the system and method for delivering the invention without departing from the spirit of same will be clear to those knowledgeable in the field, and such variations are within the scope of the invention as described and claimed, whether or not expressly described.

What is claimed is:

1. An energy absorbing and transmitting material comprising a framework of interconnected units comprising:
    a plurality of units, each unit having a base and a protrusion extending from the base along an axis, the protrusion being tapered towards the uppermost portion of the protrusion, and
    a plurality of connecting members, each connecting member connecting one unit to an adjacent unit, each connecting member extending substantially perpendicular to the axes, the base extending below the connecting members and the protrusion extending above the connecting members,
    wherein the framework is comprised of a single elastic material throughout, and wherein, when a force is applied to the protrusions of one or more units offset from the axes at an angle greater than 0 degrees and less than 90 degrees, each of those units tilts towards an adjacent unit,
    and wherein each of the bases is shaped to facilitate tilting or deflection of the corresponding unit against an underlying surface contacting the bases,
    and wherein the uppermost portion of each protrusion is unconstrained to permit complete deflection of the units under a sufficient load so that each completely defected unit rests on another unit, on a connecting member, or on the underlying surface.

2. The material of claim 1, wherein each of the protrusions has a tip extending from the protrusion along the axis.

3. The material of claim 2, wherein an exterior surface of each of the tips has an angle of deviation from the corresponding axis that is different from the angle of deviation of an exterior surface of the corresponding protrusion.

4. The material of claim 3, wherein each of a plurality of the protrusions is conical, and the corresponding tip comprises a cylinder or cone.

5. The material of claim 1, wherein the protrusions and/or bases are conical, frusto-conical, cylindrical, ovoid, hemispherical or polyhedral shapes.

6. The material of claim 1, wherein the connecting members are rods that connect units to adjacent units which transmit torsion along their length, wherein each connecting member connects directly only to two adjacent units.

7. The material of claim 1, wherein each of the protrusions is conical having a radius at its base that is substantially equal to the base of the corresponding unit.

8. The material of claim 1, wherein each of a plurality of the units further comprises at least one base projection extending from the base opposite to the protrusion, wherein the at least one base projection is shaped to minimize contact with the underlying contact surface so as to increase the tendency of the unit to tilt or deflect.

9. The material of claim 1,
wherein each of a plurality of the units further comprises two or more base projections extending from the base of the unit opposite to the protrusion and spaced apart and arranged on the base.

10. The material of claim 1, wherein each unit is connected to adjacent units along at least one or more longitudinal axes.

11. The material of claim 10, wherein the units are connected to adjacent units along two or more longitudinal axes.

12. The material of claim 11, wherein the units are connected to adjacent structural units along three or more longitudinal axes.

13. The material of claim 1, wherein at least one unit has a width that is less than the width of at least one adjacent unit.

14. The material of claim 1, wherein the at least one unit and the at least one adjacent unit have different volumes.

15. The material of claim 2, wherein the protrusion comprises a plurality of supports which extend from the base to support the tip.

16. The material of claim 1, wherein the base is an annulus.

17. The material of claim 1, wherein the at least one connecting member is absent, thereby permitting the at least one unit and the at least one adjacent unit to be in direct contact.

18. The material of claim 1, wherein the material is made of an elastic foam, a polymer or elastomer, or a natural rubber.

19. The material of claim 18, wherein the material is made of a hydrophobic closed-cell foam.

20. The material of claim 1, wherein the units are intersected by a datum, which is flat or curved.

21. The material of claim 20, wherein the units are regularly spaced on the datum.

22. The material of claim 21, wherein the units of the framework are arranged in a square or triangular grid.

23. The material of claim 8, wherein each of a plurality of the base projections is hemispherical.

24. The material of claim 1, wherein each of a plurality of the bases is hemispherical and the units are not hollow.

25. The material of claim 24, wherein the material is molded.

26. An energy absorbing and transmitting material comprising:
a framework of interconnected units comprising:
at least one unit having a base and a protrusion extending from the base along an axis,
at least two adjacent units, each adjacent unit being adjacent to the at least one unit, each adjacent unit having a base and a protrusion extending from the base along an axis, the axes being substantially parallel to each other when the framework is at rest,
at least two connecting members, each connecting member connecting the at least one unit proximate to the base to one of the adjacent units proximate to the base of the adjacent unit, the connecting members extending substantially perpendicular to the axes between the units when the framework is at rest the base extending below the connecting members and the protrusion extending above the connecting members,
wherein the connecting members are elastic, and when a force is applied to the protrusions of one or more units offset from the axis at an angle greater than 0 degrees and less than 90 degrees, each of those units is tilted towards another unit,
and wherein the bases are shaped to facilitate tilting or deflection of the units against an underlying surface contacting the bases,
and wherein the uppermost portion of each protrusion is unconstrained to permit complete deflection of the units under a sufficient load so that each completely defected unit rests on another unit, on a connecting member, or the underlying surface.

27. The material of claim 26, wherein at least one unit and at least one adjacent unit have differing densities.

* * * * *